(No Model.)

C. LEHMAN.
NUT LOCK.

No. 522,907. Patented July 10, 1894.

WITNESSES
G. S. Elliott
E. M. Johnson

Charles Lehman
INVENTOR

By _____ Attorney

THE NORRIS PETERS CO., PHOTO-LITHO., WASHINGTON, D. C.

UNITED STATES PATENT OFFICE.

CHARLES LEHMAN, OF JOHNSTOWN, PENNSYLVANIA.

NUT-LOCK.

SPECIFICATION forming part of Letters Patent No. 522,907, dated July 10, 1894.

Application filed March 17, 1894. Serial No. 504,026. (No model.)

*To all whom it may concern:*

Be it known that I, CHARLES LEHMAN, a citizen of the United States of America, residing at Johnstown, in the county of Cambria and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a washer of improved construction which when applied to the bolt and acted upon by the nut will be flattened to cause teeth formed thereon to be embedded in the body portion of the bolt, the other edge of the washer having projecting portions over which the nut will ride when applied to the nut and turned in one direction thereon, said projections being adapted to engage with the corners or sides of the nut to prevent the same turning upon the bolt, thereby forming a duplex locking means for the bolt, as will be hereinafter fully set forth and particularly pointed out in the claims.

Figure 1:
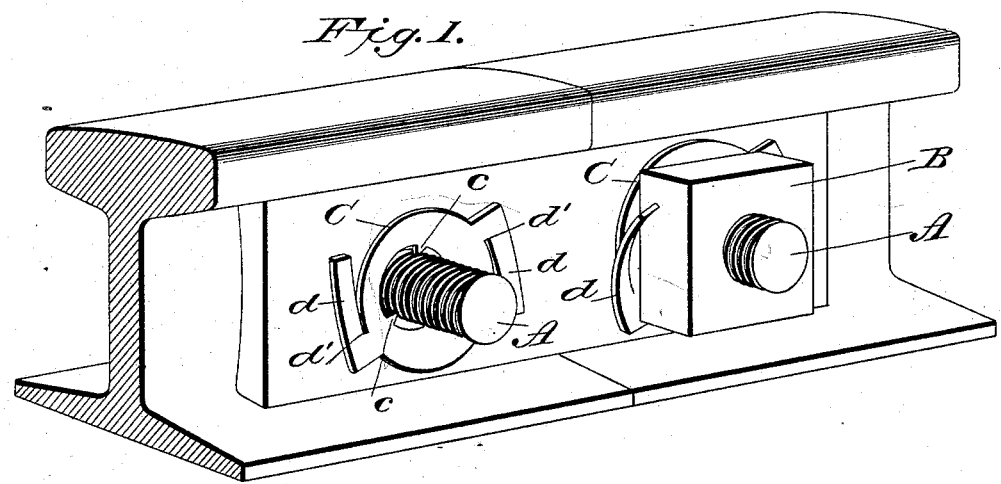
Figure 2:
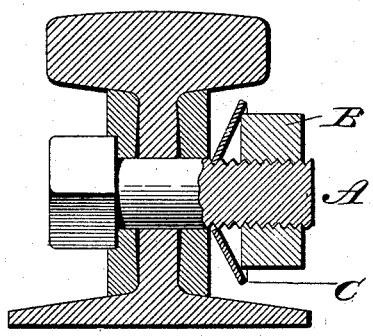
Figure 3:
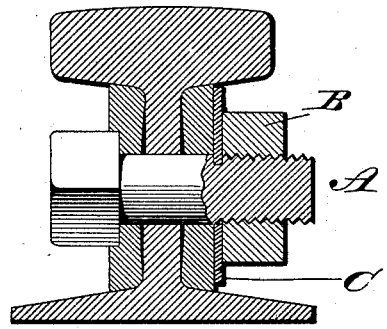
Figure 4:
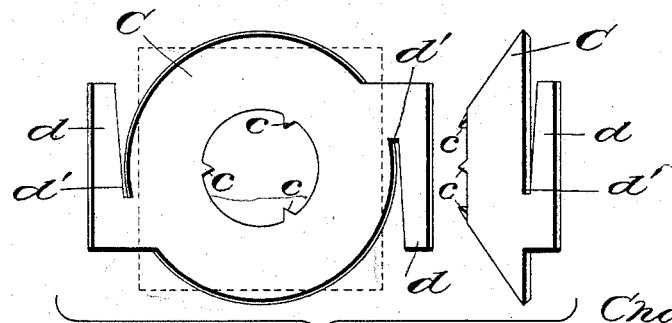

In the accompanying drawings, Figure 1 is perspective view showing the washer applied, one part of the view showing a nut in connection with the washer. Figs. 2 and 3 are sectional views and Fig. 4 views of the side and face of the washer the side view showing the teeth on the same line as the side of the washer.

A designates the bolt and B the nut; these parts being of ordinary construction.

C designates the washer which is provided with a central aperture into which project teeth $c$ formed integral with said washer the teeth $c\,c\,c$ being equi-distant from each other, and projecting on the same line as the side of the washer, so as to better engage with the thread of the bolt when applied thereto; and so that the teeth will be forced into the bolt when the washer is flattened. The size of the washer is such that the nut will bear upon the same adjacent to its periphery, or the corners of the same may extend beyond the periphery of the washer so as to engage with one side of the projecting portions $d$, and the nut when turned in one direction is adapted to ride over said projecting portions.

It will be observed that the washer in its normal shape, before being applied, is concavo-convex and is adapted to be flattened by the pressure of the nut upon the concave side. The distance of the teeth $c$ from each other is such that they may be readily passed over the threads of the bolt, but when the washer is flattened they will be forced into the body portion of the bolt below the threads and the part of the projecting portions $d$ of the washer which joins the same will also be flattened but that part which is separated from the washer by the slit $d'$ will still retain its shape and not lie on the same plane as the washer but project upwardly to engage the corners of the nut and form a secure ratchet lock.

It will be noted that by the construction hereinbefore described the washer is permanently attached to the bolt and would of itself be sufficient to retain the bolt in place, for should the nut from any cause whatever become detached the bolt cannot be removed without destroying the washer.

In manufacturing the washer the teeth $c$ are equi-distant from each other and of such a distance apart that they can be readily passed over the threaded portion of the bolt and may enter the thread. The washer is stamped from a piece of flat metal and is then dished to give it the proper concavo-convex form.

It will be obvious that when the washer is bent or flattened by the nut the part of the projection $d$ adjoining the washer will follow the bend of the same while the terminal portion of the projection will extend beyond the plane of said washer. This result is attained partially by extending the projecting portion at a tangent with the periphery of the washer, and these projections are of considerable length so that the resiliency of the metal will be brought into play so that they will retain the curvature given to the flat plate when it is stamped or dished into its concavo-convex form, the said projections forming an effective ratchet-lock which will spring upwardly after being depressed by the nut contacting therewith.

I am aware that it has been proposed to provide a flat washer with tongues which are bent at an angle with the face of the washer, the tongues having serrated ends, such a washer also having projections which extend beyond the periphery of the washer and are adapted to be bent in contact with the nut. I do not claim such construction, as with the same the teeth formed by serrating the inwardly projecting tongues do not secure such a firm grip upon the bolt as short teeth which are formed rigidly with the metal and are equi-distant, and with my improvement it is not necessary to bend the outer projections in contact with the sides of the nut.

Having thus described my invention, what I claim as new, and desire to secure by Letters Patent, is—

1. As an improved article of manufacture, a lock washer for bolts, said washer being concavo convex and provided with a central aperture with teeth $c\ c\ c$ which are equi-distant from each other and project on the same line as the side of the washer and tangential projecting portions $d$ which are partially separated from the washer by slits, the free ends of the projecting portions extending a sufficient distance so as to be adapted to be beyond the path of the nut so that the corners of the nut will engage the intermediate portions, the end of the projecting portions $d$ retaining the shape imparted thereto when the flat washer is dished to be concavo-convex substantially as shown and for the purpose set forth.

2. In a nut-lock, the combination with a bolt and nut of ordinary construction, of a concavo-convex washer having a central aperture with teeth $c\ c\ c$, the teeth being adapted to engage with the threads of the bolt, tangential projecting portions $d$ which are positioned beyond the periphery of the washer, said washer being adapted to be flattened by the pressure of the face of the nut on the outer edge of the washer so as to force the teeth $c$ into the body of the bolt, the projecting portions $d$ retaining their configuration when the washer is flattened so that the inner edge of such projecting portions will engage the side of the nut, substantially as shown.

In testimony whereof I affix my signature in presence of two witnesses.

CHARLES LEHMAN.

Witnesses:
CHAS. BERRY,
L. J. FOUST.